US007635849B2

(12) United States Patent
Klein et al.

(10) Patent No.: US 7,635,849 B2
(45) Date of Patent: Dec. 22, 2009

(54) DETECTOR

(75) Inventors: Martin Klein, Mannheim (DE); Christian Schmidt, Heidelberg (DE)

(73) Assignee: Universitat Heidelberg (DE)

( * ) Notice: Subject to any disclaimer, the term of this patent is extended or adjusted under 35 U.S.C. 154(b) by 372 days.

(21) Appl. No.: 10/047,556

(22) Filed: Oct. 23, 2001

(65) Prior Publication Data

US 2002/0139935 A1 Oct. 3, 2002

(51) Int. Cl.
*G01T 3/00* (2006.01)

(52) U.S. Cl. ................ 250/390.01; 250/374; 250/385.1

(58) Field of Classification Search ............ 250/390.01, 250/374, 385.1
See application file for complete search history.

(56) References Cited

U.S. PATENT DOCUMENTS 3,956,654 A * 5/1976 Gleason ...................... 250/374
6,011,265 A * 1/2000 Sauli .......................... 250/374
6,429,578 B1 * 8/2002 Danielsson et al. .. 313/105 CM

OTHER PUBLICATIONS

"The yellowbook guide to neutron research facilities at ILL", Institute Laue-Langevin, Grenoble, Dec. 1997.

Vellettaz et al., "Two-dimensional gaseous microstrip detector for thermal neutrons", Nuclear Instruments & Methods A 392 (1997), pp. 73-79.

G.B. Spector et al., "Advances in terbium-doped, lithium-loaded scintillator glass development", Nuclear Instruments & Methods A 326 (1993), pp. 526-530.

F. Sauli, GEM: "A new concept for electron amplification in gas detectors", Nuclear Instruments & Methods A 386 (1997), pp. 531-534.

Advances in Gas Avalanche Photomultipliers—A. Breskin et al., Dept. of Particle Physics, The Weizzmann Institute of Science 76100, Rehovot, Isreal—Presented at Beaunee99, The Second International Conference on New Developments in Photodetection, Beaune, France, Jun. 21-25, 1999.

* cited by examiner

*Primary Examiner*—David Porta
*Assistant Examiner*—Shun Lee
(74) *Attorney, Agent, or Firm*—Gerald E. Hespos; Anthony J. Casella

(57) ABSTRACT

The invention relates to a detector for detecting electrically neutral particles. The detector has a housing (10) filled with a counting gas. A converter (22) in the housing (10) generates conversion products as a result of the absorption of the neutral particles. The conversion products generate electrically charged particles in the counting gas, and a readout device (19) detects the electrically charged particles. A device (18) generates an electrical drift field for the electrically charged particles in a region of the volume of the counting gas so that at least some of the electrically charged particles drift toward the readout device (19). The converter device (22) is of charge-transparent design and being arranged in the detector housing (10) so that the drift field passes through at least part of this device.

15 Claims, 5 Drawing Sheets

DETECTOR

BACKGROUND OF THE INVENTION

1. Field of the Invention

The invention relates to a detector for detecting electrically neutral particles, to a converter device for a detector for detecting electrically neutral particles, to a method for producing a converter device and to a detection method for detecting electrically neutral particles.

2. Description of the Related Art

The use of low-energy neutron radiation, known as thermal and cold neutrons, is an important method used in science (for example for applications in physics, chemistry, biology and medicine) and engineering (for example non-destructive testing). The basis for all the application areas in science and engineering is the detection of these neutrons, and consequently detectors and methods for detecting neutrons have become economically very important in recent decades. For physical reasons, the detection of neutrons can only be achieved as a result of a nuclear reaction thereof with a neutron converter. This causes the neutrons to be trapped or absorbed by the atomic nuclei of the converter, with these nuclei then spontaneously breaking down. The most high-energy, electrically charged fragments formed during this breakdown are jointly referred to as conversion products and can then be detected on account of their ionizing effect.

Hitherto, the gas helium-3, the atomic nuclei of which comprise two protons and one neutron, has predominantly been used to detect neutrons. In what are known as gas detectors, this helium isotope is added to the actual counting gas of the detector in predetermined quantities. Neutrons which are to be detected are absorbed by the helium-3 nuclei, which subsequently spontaneously break down in accordance with the following nuclear reaction $^{3}He+^{1}n\rightarrow^{3}H+^{1}p+764$ keV, the tritium nucleus containing a quarter and the proton three quarters of the reaction energy. These conversion products, as high-energy, charged particles, have an ionizing effect on the counting gas of a gas detector of this type. When helium-3 gas detectors are being used to detect neutrons, the conversion products in the counting gas therefore generate charged particles, in particular free electrons. These primary electrons are guided to the electrodes of a readout structure as a result of the application of an electrical drift field. Suitable shaping of the readout structure means that the electrical field in the vicinity of the electrodes is so high that the primary charge can be hugely amplified with the aid of secondary gas ionization processes (gas amplification). The total charge generated in this way is subsequently collected at the electrodes and is fed to an electronic evaluation device via a preamplifier.

However, neutron detectors of this type in the form of conventional gas detectors with helium-3 as the neutron converter have considerable drawbacks. Specifically, to achieve an attractive detection efficiency of, for example, approximately 50% for thermal neutrons and at the same time to be able to determine the location of incidence of the neutrons, with a gaseous neutron converter such as helium-3, detectors of this type have to be operated at a gas pressure of 5 to 10 bar. The high operating pressure means that this requires complex and expensive pressure vessels. On account of the design limitations of the pressure vessels, detection of neutrons above large detection areas can only be achieved with the aid of large detector arrangements which are in the form of a matrix and comprise a multiplicity of small individual detectors. For example, the IN5 neutron spectrometer produced by Laue-Langevin in Grenoble for angularly resolved neutron detection has 1400 individual helium-3 neutron detectors (cf.

"The yellowbook guide to neutron research facilities at ILL", Institute Laue-Langevin, Grenoble, December 1997). The spatial resolution of approx. 2 cm×10 cm and the typical counting rate acceptance of 10,000neutrons detected per second and $cm^2$ of a neutron detector of this type are, however, highly unsatisfactory.

Although the poor resolution and the low counting rate acceptance can be improved by combining helium-3 as converter with a microstrip detector (MSGC) to approx. 2 mm×2 mm and one million neutrons per second and $cm^2$ (cf. Vellettaz et al., "Two-dimensional gaseous microstrip detector for thermal neutrons", Nuclear Instruments and Methods A 392 (1997), pages 73 to 79), the structure of these detectors is very complex and expensive even for a detector area of only 100 mm×100 mm, on account of the high gas pressure. Furthermore, the MSGC technology has proven to be highly susceptible to faults. A further drawback is the poor time resolution of the gas detectors which have been described to date. Since thermal neutrons are absorbed anywhere in the depth of the gas volume, the location of the neutron absorption and therefore the passage time through the detector are not accurately known. The inaccuracy in the passage time and therefore in the time resolution is approximately 10 μs for thermal neutrons at typical depths of the absorbing gas volume of approximately 2 cm.

Furthermore, neutron scintillation detectors are known for the detection of neutrons. With detectors of this type, a solid neutron converter is admixed with a solid or liquid scintillator, for example in the form of a fine powder (cf. G. B. Spector et al., "Advances in terbium-doped, lithium-loaded scintillator glass development", Nuclear Instruments and Methods A 326 (1993), pages 526 to 530). The conversion products which are formed in a neutron detection reaction deposit their energy in the scintillator. The light radiated onto them using the scintillator is then detected in a position-sensitive manner using a suitable light detection system. Detectors of this type have typical detection efficiencies of 20% to 40%. However, detection of the scintillation light causes problems. Since detection concepts of this type are relatively highly sensitive to X-radiation and gamma radiation, which cannot be avoided in a reactor or neutron environment, their possible applications are greatly restricted. In particular, this background which is attributable to X-radiation and gamma radiation makes detectors of this type unsuitable for the individual detection of neutrons or the detection of very low neutron intensities, and consequently detector systems of this type are only able to detect distributions with intensive event rates in a positionally dependant manner.

It is an object of the invention to provide a detector for electrically neutral particles, in particular neutrons, which combines a high detection sensitivity with a simple and therefore inexpensive design. A further object of the invention is to provide a converter device for a detector of this type for detecting neutral particles, and a corresponding method for producing the converter device. A final object of the invention is to propose a corresponding method for detecting electrically neutral particles.

SUMMARY OF THE INVENTION

According to the invention, a detector for detecting electrically neutral particles, in particular neutrons, comprises a detector housing which at least in certain regions is filled with a counting gas, at least one converter device which is arranged in the housing and generates conversion products as a result of the absorption of the neutral particles which are to be detected, the conversion products generating electrically charged particles in the counting gas, at least one readout device for detecting the electrically charged particles, at least one device for generating an electrical drift field for the electrically charged particles in at least a region of the volume of the counting gas in such a manner that at least some of the electrically charged particles drift toward the readout device, the converter device being of charge-transparent design and being arranged in the detector housing in such a manner that the drift field passes through at least part of this device.

The detector according to the invention is designed to detect electrically neutral particles, in particular neutrons and other neutral particles, in particular photons. The detection principle is based on the fact that the neutral particles interact with a converter device which, as a result of this interaction (for example a nuclear reaction), generates conversion products. For this purpose, the converter device preferably contains a solid converter material. The conversion products then ionize the counting gas or the gas with which at least regions of the detector housing are filled and which at least in regions surrounds the converter device. As a result, electrically charged particles, in particular electrons, are generated and can move in the counting gas under the influence of an electric field. To enable the electrically charged particles to be detected, they are fed to a readout device under the influence of an electrical drift field. For this purpose, the detector has a device for generating a drift field, which may in particular be provided separately from the converter device and the readout device. However, it is also possible to design the device for generating a drift field as part of the converter device. The readout device may also be included for the generation of the drift field, so that the device for generating a drift field can be produced in particular by a special design of the converter and readout device. According to the invention, the at least one converter device is of charge-transparent design, i.e. it has a high transmission coefficient for the electrically charged particles. Preferably, the electrically charged particles can pass through the converter device while maintaining their position information.

According to a preferred embodiment, the converter device has a multiplicity of passages, which are preferably arranged in the form of a matrix, for the electrically charged particles. Alternatively, it is also possible to use a random arrangement of the passages, so that the passages form, for example, a pattern of holes with any desired distribution. The passages may, for example, be designed as geometrically formed apertures or holes in the converter device. Furthermore, a passage may also be formed by a charge-transparent zone which, compared to the adjoining material, has only a small interaction cross section for the electrically charged particles, in order in this way to have a high transmission coefficient for the charged particles. The converter device particularly preferably has a regular matrix of circular apertures.

According to a further preferred embodiment, the passages have a minimum diameter of between 10 μm and 1000 μm, preferably 25 μm to 500 μm, and a minimum spacing from one another of from 10 μm to 500 μm, preferably 15 μm to 300 μm.

According to a particularly preferred embodiment, the detector has a multiplicity of, preferably 2 to 20, most preferably 10, converter devices arranged in cascade form (in series). In particular, the converter devices may in each case be arranged at a distance from one another in the form of a stack in the detector housing, so that the counting gas is situated between the converter devices. The result is a large active surface area for the interaction with the converter device which is required for detection of the neutral particles. Because of the charge-transparent nature of the converter devices, the charged particles which are generated by the conversion products and the detection of which allows the neutral particles to be detected can be moved through the cascade of converter devices to the readout device by means of the drift field. The use of converter devices arranged in cascade form in the detector according to the invention accordingly enables the interaction surface area available for the electrically neutral particles to be increased enormously and therefore enables the detection sensitivity to be increased considerably.

Preferably, a region of the converter device which is active in the conversion of the electrically neutral particles is of large-area, in particular planar, design and is preferably arranged substantially perpendicularly in the drift field. As well as planar surfaces, large-area structures which are curved as desired are also conceivable, for example cylindrical structures. This large-area or film-like structure of the converter device allows the surface to volume ratio of the converter device to be improved further. Although the (solid) converter material in the entire volume is typically sensitive to the neutral particles which are to be detected, the conversion products often only have a relatively restricted range in the converter material and therefore can only escape from this material if they lie sufficiently close to its surface; this means that to achieve a high detection sensitivity, it is advantageous, for a given converter volume and mass, to have as large a converter surface area as possible available for detection. Particularly efficient and rapid diversion of the charged electrical particles generated to the readout device is achieved if the converter device is arranged substantially perpendicularly in the drift field. Accordingly, the mean field direction of the drift field is advantageously substantially parallel to the surface normal of the converter device, which is of large-area design. An inclined arrangement of the converter device is also possible, provided that the plane of the large-area converter device does not run parallel to the drift field.

According to a preferred embodiment, the device for generating a drift field has a large-area, optionally structured drift electrode in order to generate the drift field between the drift electrode and the readout device. To detect electrons which have been generated in the counting gas by the conversion products, the drift electrode is negatively biased with respect to the readout device. The drift electrode can be dispensed with if its function is performed by an electrode layer of the converter device.

According to a particularly preferred embodiment, the converter device comprises a first conductive layer and a second conductive layer, which are electrically insulated from one another by an insulator layer arranged between them, and at least one converter layer, which is preferably arranged on the first conductive layer and/or on the second conductive layer. The converter device therefore has a layered structure. The insulator layer used is, by way of example, a plastic film, in particular a polyimide film. So-called KAPTON films (KAPTON is a trade name belonging to DUPONT) have proven particularly successful. This insulating layer electrically insulates the two conductive layers from one another. The conductive layers are preferably layers of metal which have been applied directly to the insulating layer by means of a coating process. In particular, copper layers are suitable for the conductive layers. The layered converter device also comprises a converter layer, which is preferably arranged on that surface of the first conductive layer and/or of the second conductive layer which is remote from the insulator layer. However, it is equally possible for the converter layer to be arranged between one of the conductive layers, which are in particular thin and structured, and the insulator layer. If the converter layer can be designed as a conductive layer, there is no need for an additional conductive layer in the converter device.

A particularly preferred layered converter device of this type can be produced by means of what are known as GEM films (gas electron multiplier films), as are described, for example, in U.S. Pat. No. 6,011,265 and in the publication by F. Sauli in Nucl. Inst. and Methods A 386 (1997), pages 531 to 543. These GEM films described in the documents cited are KAPTON films which are coated on both sides with copper and were developed in 1997 at CERN by F. Sauli. A photolithography process is used to etch a regular pattern of holes into these GEM films, without the copper top and bottom sides of the films being electrically connected to one another. With regard to the detailed disclosure in terms of production, structure and electrical circuitry and other properties of the GEM films, reference is made in full, in terms of the disclosure of the present invention, to the documents cited above, so that the disclosure of these documents is to form an integral part of the disclosure of the present invention. There is therefore no need to repeat in its entirety the detailed description of the GEM films explained in these documents.

However, the layered converter device described differs from the GEM films proposed by F. Sauli in particular by virtue of the additional converter layer which is present. Furthermore, in the applications which are discussed in the above documents, the GEM films are operated exclusively in a gas amplification mode. In this case, suitable electrical circuitry is used to build up field strengths between the two conductive layers which are such that there is a cumulative multiplication of the primary electrons, so that the films form a "gas electron multiplier" (GEM). Preferably, however, the converter devices according to the present invention are not operated in a gas amplification mode of this type, but rather only the charge-transparent property of the GEM films is used.

According to a further preferred embodiment, the first and second conductive layers of the converter device are electrically connected to one another via a device for generating a converter field. The device for generating a converter field makes it possible to generate an electrical drift field which in particular may act in addition to the drift field generated by the device for generating a drift field. This ensures that the electrically charged particles can be efficiently passed through the converter device.

Preferably, the (solid) converter layer contains a neutron converter layer, so that the detector is suitable for the detection of neutrons, the neutron converter layer containing in particular lithium-6, boron-10, gadolinium-155, gadolinium-157 and/or uranium-235. If UV and/or X-ray photons are to be detected as neutral particles, CsI is particularly suitable as a material for the photon converter layer.

According to a further preferred embodiment, the converter layer has a layer thickness of from 0.1 μm to 10 μm, preferably, for a neutron converter layer substantially consisting of boron-10, between 0.5 μm and 3 μm, most preferably approximately 1 μm, the first and second conductive layers have a layer thickness of from 0.1 μm to 20 μm, preferably 0.2 μm to 10 μm, and the insulator layer has a layer thickness of from 10 μm to 500 μm, preferably 25 μm to 100 μm.

According to the invention, a converter device for a detector for detecting electrically neutral particles, in particular neutrons, comprises a first conductive layer and a second conductive layer which are electrically insulated from one another by an insulator layer arranged between them, and at least one (solid) converter layer, which is preferably arranged on the first conductive layer and/or on the second conductive layer, the converter device having a multiplicity of passages, which are preferably arranged in the form of a matrix, for electrically charged particles. A converter layer of this type can be used in combination with a conventional gas detector for simple and highly sensitive detection of neutral particles, in particular neutrons. For this purpose, the converter device is introduced into the drift field of the gas detector. It is particularly preferable if a "stack" of converter devices in a cascade arrangement is used rather than an individual converter device, since this allows the detection sensitivity to be increased enormously.

The converter device preferably contains a neutron converter material, so that the converter device is designed for a detector for detecting neutrons, the neutron converter material in particular containing lithium-6, boron-10, gadolinium-155, gadolinium-157 and/or uranium-235.

According to the invention, a method for producing a converter device for a detector for detecting electrically neutral particles, in particular neutrons, comprises the following steps: providing an insulator layer which is arranged between two electrically conductive layers, so that the electrically conductive layers are electrically insulated from one another; and providing a converter layer, in particular a neutron converter layer.

The neutron converter layer in this case preferably contains at least one neutron converter material as listed above. As described above, the converter device according to the invention can be produced in particular from a GEM film to which an additional converter layer is applied. By way of example, a boron-10 layer can be deposited on a GEM film by means of electron beam evaporation of a boron-10 powder or granules.

According to the invention, a detection method for detecting electrically neutral particles, in particular neutrons, comprises the following steps: trapping the electrically neutral particles which are to be detected using at least one converter device which generates conversion products when the neutral particles are absorbed; generating electrically charged particles in a counting gas or gas by means of the conversion products; diverting or accelerating the electrically charged particles in an electrical drift field to a readout device, at least some of the electrically charged particles being passed through the charge-transparent converter device, in particular through a multiplicity of passages, which are preferably arranged in the form of a matrix, in the converter device; and detecting the electrically charged particles in the readout device.

The charge-transparent design of the converter device enables the charged particles to be passed through the converter device(s) without losing their position information. It therefore follows from the charge transparency that the location where the charged particles are generated in the counting gas is reproduced or transferred without distortion through the converter device(s) to the readout device, which is preferably position-sensitive.

BRIEF DESCRIPTION OF THE DRAWINGS

The invention is described below by way of example with reference to the appended drawings, in which.

DETAILED DESCRIPTION OF THE PREFERRED EMBODIMENTS

Figure 1:
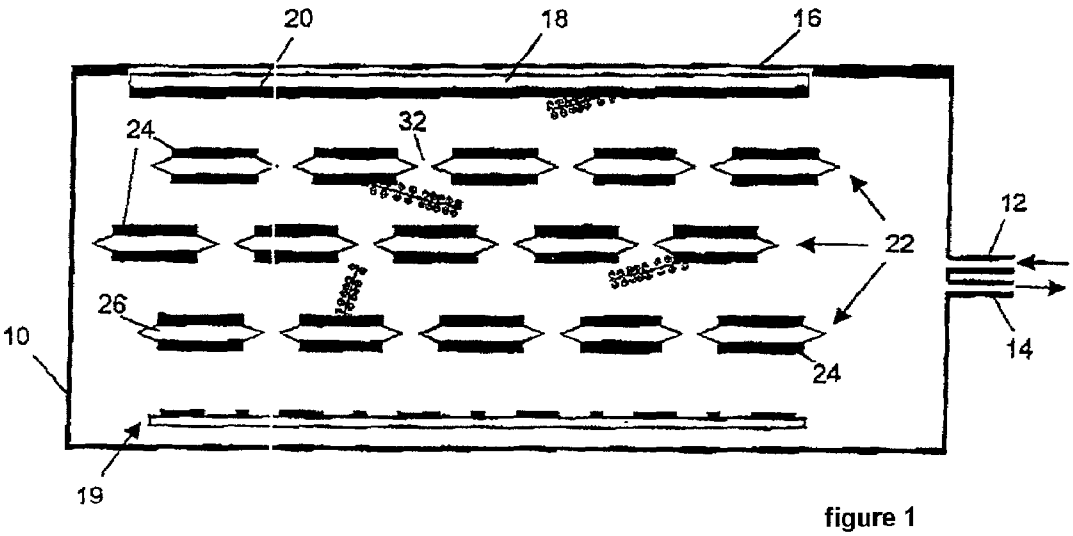
FIG. 1 shows a diagrammatic sectional view of a detector for detecting neutrons according to one embodiment of the invention.

FIG. 1 shows a highly diagrammatic sectional view and FIG. 2 shows diagrammatic perspective views of a detector for the detection of neutrons in accordance with one embodiment of the invention. The construction of the detector will be described first of all, with reference to FIGS. 1 and 2.

A gas (not shown) or counting gas is introduced into a detector housing 10, which may be part of a conventional gas detector, via a gas supply 12. There is also a gas outlet 14 for venting the detector housing. All counting gases which are customary for gas detectors can be used. All that is necessary is for the conversion products which are formed in the nuclear reaction which is to be described below to have an ionizing effect on the gas. Mixtures of argon with one or more of the components $CO_2$ (10-90% share), $CF_4$, dimethyl ether, isobutane and $CH_4$ have proven particularly suitable. Unlike with conventional helium-3 neutron detectors, it is not necessary for the counting gas to be held under high pressure, but rather it may advantageously be introduced into the detector housing 10 under standard pressure.

An entry window 16 is recessed in the top side of the detector housing 10. Since the detector shown is preferably not operated at an elevated counting gas pressure, the entry window 16 can be very thin, so that it has only a small action cross section for the absorption of the incident neutrons. Moreover, the incident neutrons are only very slightly deflected by the thin entry window. In the detector housing 10, a drift electrode 18, which is part of a device for generating a drift field, is arranged adjacent to or in the vicinity of the entry window 16. An electrical drift field for electrically charged particles can be applied between the drift electrode 18 and a readout device 19, which is to be described below, by means of a voltage source (not shown), the drift electrode being at a negative voltage with respect to the readout device 19. A layer 20 of a solid neutron converter, for example a boron-10 layer, may optionally be applied to the drift electrode 18.

In the embodiments of the detector according to the invention which are shown in FIGS. 1 and 2, the device for generating a drift field comprises the drift electrode 18 as first electrode and the readout device as (structured) second electrode. However, it is also possible, instead of using the readout device 19 as the second electrode, to provide a second drift electrode which is separate from this device. Furthermore, a conductive layer of the adjacent converter device 22 can also act as the drift electrode 18, so that the drift electrode 18 can be dispensed with.

Three converter devices 22 which are arranged in cascade form above one another are also provided in the detector housing 10. The converter devices 22 are located substantially in the drift field which is generated between the drift electrode 18 and the readout device 19. As illustrated in particular in FIG. 3, the converter devices 22 are preferably of layered structure and consist, for example, of a GEM film (cf. above), which is coated on one or both sides with a solid converter layer 24—in this case a neutron converter layer of boron-10. The converter layer 24 is preferably applied substantially homogeneously, although it is also possible for the converter layer 24 to be applied only in regions or in different layer thicknesses. Each of the converter devices 22 comprises an insulator layer 26, for example a polyimide film. KAPTON films have proven particularly appropriate (KAPTON is a tradename belonging to DUPONT). The insulator layer 26 is coated on both sides with a conductive material, for example copper, so that it is arranged between a first conductive layer 28 and a second conductive layer 30. The two electrically conductive layers 28 and 30 are electrically insulated from one another by the insulator layer 26. The converter device 22 also has a multiplicity of passages 32 which are arranged in the form of a matrix and through which electrically charged particles can drift, in a manner which is yet to be described. The arrangement pattern of these passages 32 which pass through the converter devices 22 in the direction normal to the layer plane is diagrammatically illustrated in FIG. 2.

The structure, electrical circuitry and production of the GEM films from which it is easy to produce preferred converter devices 22 according to the invention are described in detail in U.S. Pat. No. 6,011,265 and in the publication by F. Sauli, "GEM: A new concept for electron amplification in gas detectors", Nuclear Instruments and Methods in Physics Research A 386 (1997), pages 531-534. To avoid having to repeat all the aspects and properties of GEM films described in those documents, the text which follows refers fully to the disclosure of these cited documents. Therefore, the description in particular of the structure, electrical circuitry and production of the GEM films given in the above documents forms an integral part of the disclosure of the present invention. The GEM films (gas electron multiplier films) described in the documents cited are essentially KAPTON films which are coated with copper on both sides and were developed in 1997 at CERN by F. Sauli. A photolithography process is used to etch a regular pattern of holes into these GEM films, without the copper top and bottom sides of the films being electrically connected to one another.

The readout device 19 is arranged opposite the entry window 16 and the drift electrode 18 in the detector housing 10, in such a manner that the cascaded converter devices 22 are arranged in a stack between them. The normals to the surfaces of the entry window 16, of the drift electrode 18, of the converter devices 22 and of the readout device 19 preferably substantially coincide. The mean field direction of the electrical drift field between adjacent converter devices 22 is substantially perpendicular to the layer planes of the converter devices 22, and consequently follows the longitudinal axis of the passages 32, which are in the form of holes. The drift electrode 18 and the readout device 19 are spaced apart from the converter devices 22, the space being filled by the counting gas.

All conventional detector systems which can be used to detect charged particles, in particular electrons, can be used as readout device 19. By way of example, electrode structures which intermesh in a comb-like manner or interdigitally and which are diagrammatically illustrated in FIGS. 2*a* and 2*b* can be used as readout device 19. However, multiwire gas chambers or similar detectors can also be used. To detect the trapped charged particles—in this case electrons—detection electronics (not shown) are used in the customary way to evaluate a voltage signal between the two interdigital electrodes.

Figure 2A:
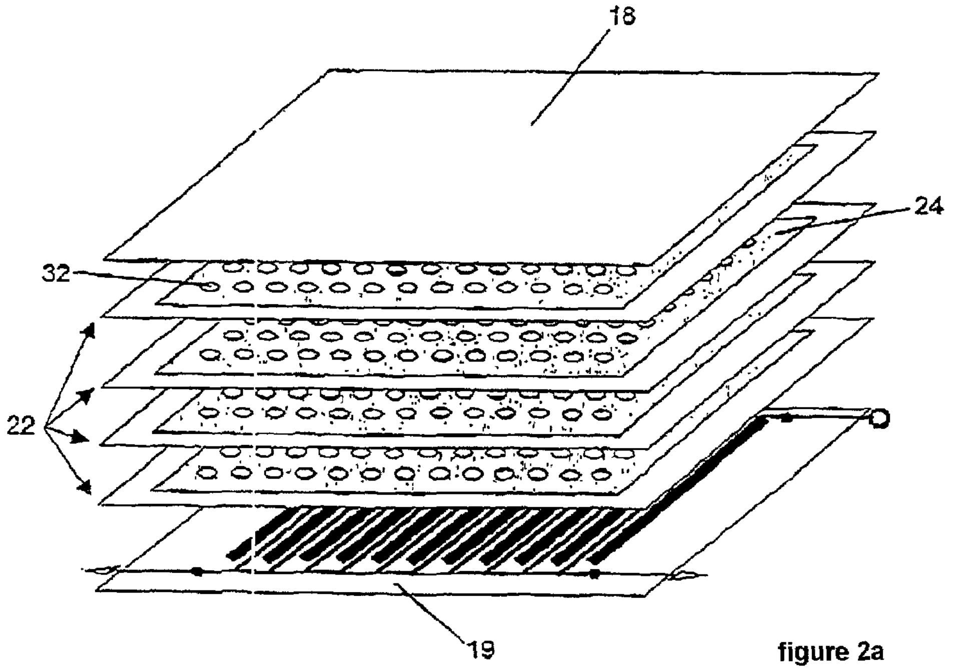
FIG. 2*a* shows a diagrammatic, perspective view of a detector for detecting neutrons in accordance with a further embodiment of the invention.
Figure 2B:
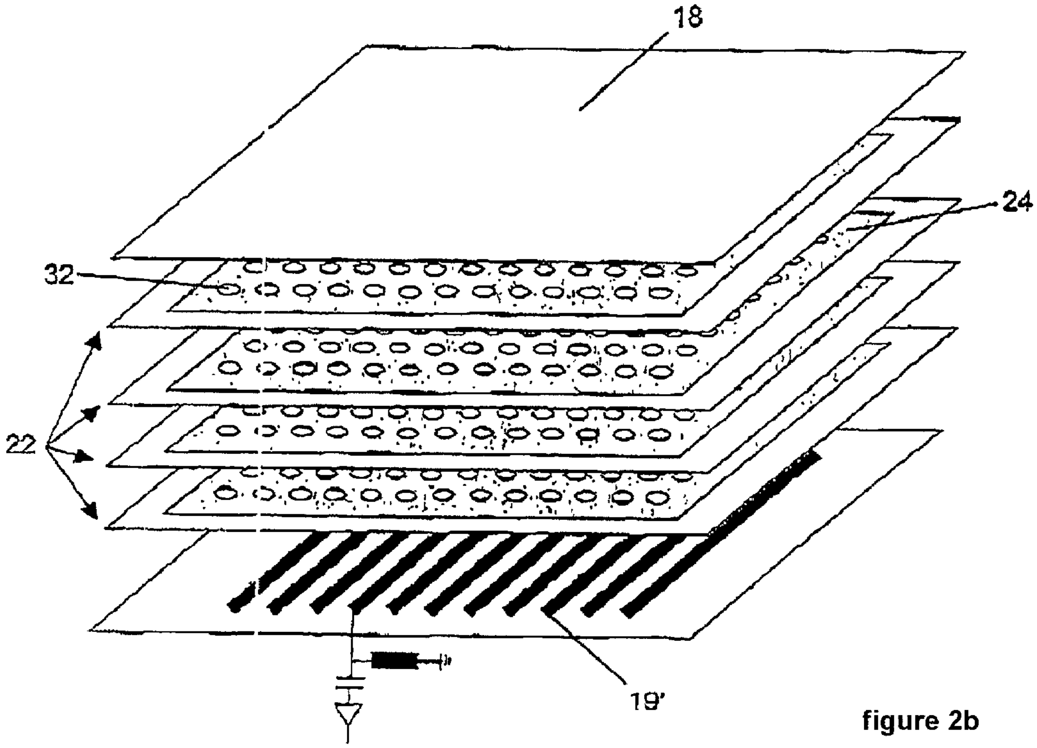
FIG. 2*b* shows a diagrammatic, perspective view of the detector shown in FIG. 2*a*, but with a different readout device.
Figure 2C:
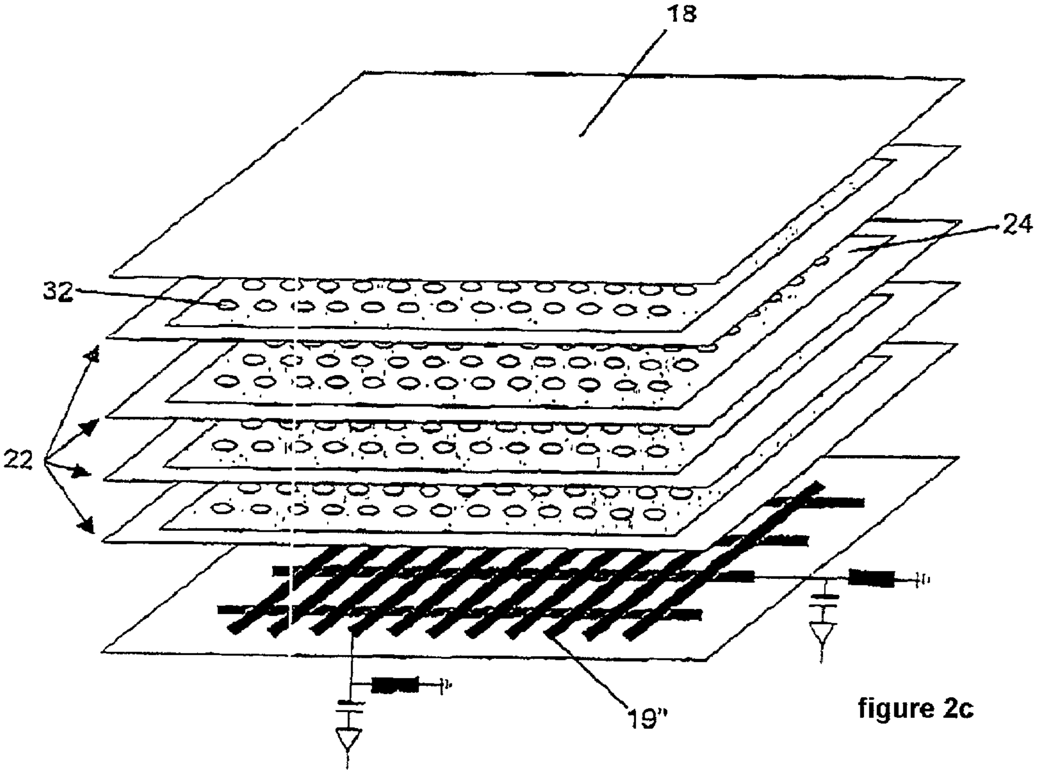
FIG. 2C shows a diagrammatic, perspective view of the detector shown in FIG. 2*a*, but with another different readout device.
Figure 2D:
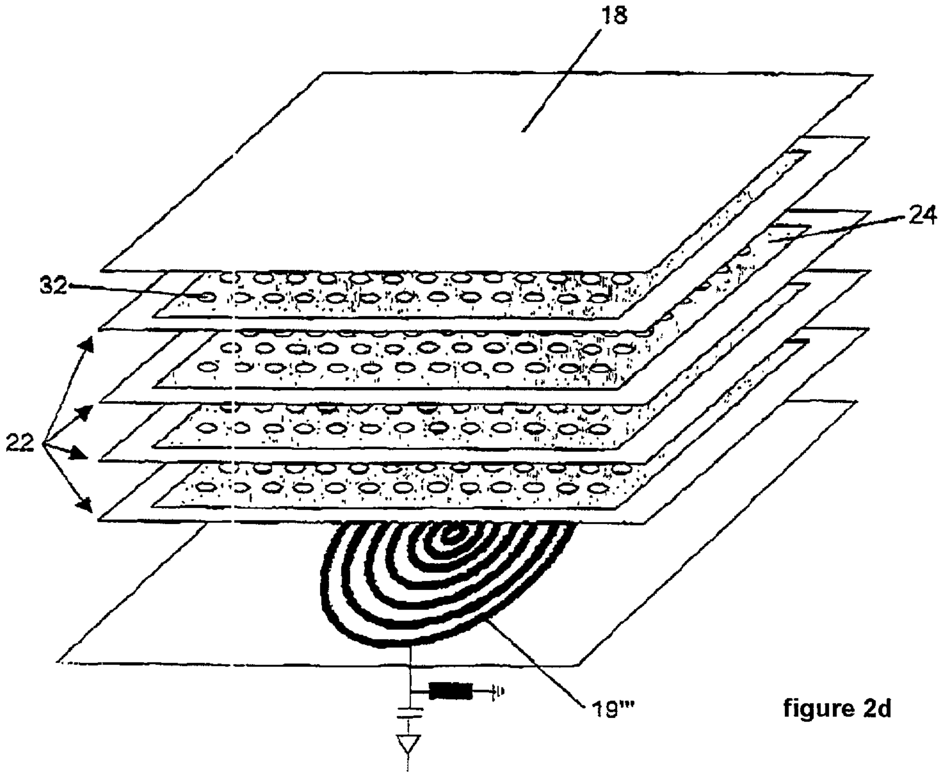
FIG. 2D shows a diagrammatic, perspective view of the detector shown in FIG. 2*a*, but with another different readout device.
Figure 3:
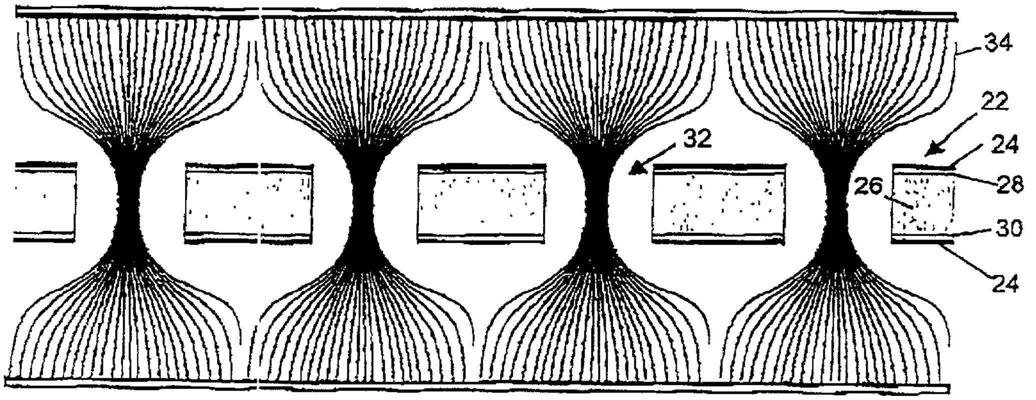
FIG. 3 shows a diagrammatic sectional view through a converter device, with field lines of the local electrical field being diagrammatically indicated.

As well as comb-like and interdigital readout structures 19 and 19' (cf. FIGS. 2*a* and 2*b*), which only supply the position information in one dimension, readout structures which are in a crossed arrangement with respect to one another and supply position resolution in two dimensions are also of interest. A readout device 19" which has been modified in this way is diagrammatically illustrated in FIG. 2*c*. In this case, two readout structures which cross one another are arranged on the top side and underside of a support plate. Annular readout structures are also of interest, primarily for scattering experiments, since they integrate over the entire azimuth angle and provide the entire intensity for a scattering angle. A readout device 19''' with an annular readout structure of this type is shown in FIG. 2*d*.

Figure 4:
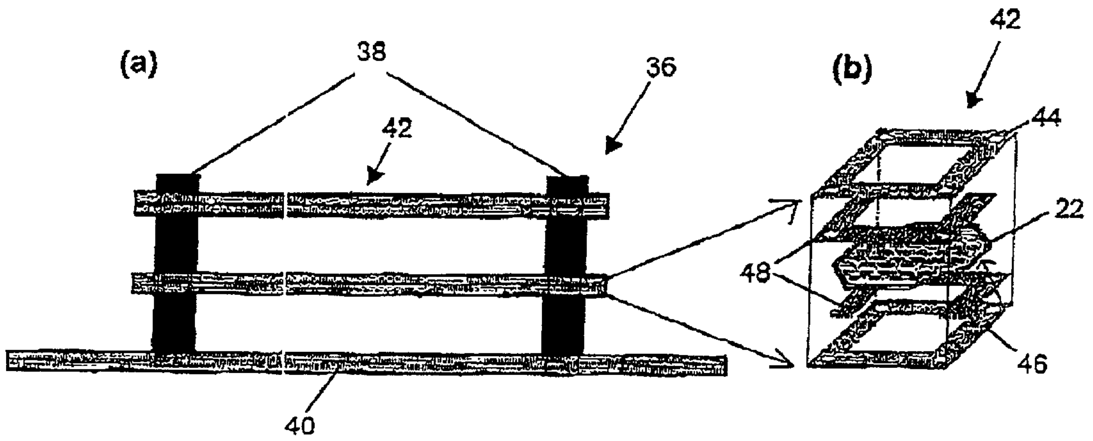
FIG. 4 shows a diagrammatic sectional view together with a perspective detailed view of an embodiment of a support device for converter devices.

FIG. 4(*a*) shows a diagrammatic sectional view through a preferred support device 36 which can be used to arrange a plurality of cascaded converter devices 22 in the detector housing 10. The support device 36 has four securing columns 38, which consist, for example, of a ceramic material and are fixed to a base plate 40. A corner section of a clamping frame 42 which is of substantially rectangular design is arranged at each of the securing columns 38.

As illustrated in the perspective exploded view shown in FIG. 4(*b*), the clamping frame 42 has an upper frame element 44 and a lower frame element 46. The frame elements 44 and 46 consist of a conductive material, for example stainless steel. One of the converter devices 22 is held between the frame elements 44, 46 under a mechanical tensile stress which is such that it is fixed in substantially smooth form, without any creases. U-shaped insulating elements 48, for example KAPTON films, are inserted between respective layer sides of the converter device 22 and the frame elements 44 and 46, these insulating elements only allowing direct contact between the frame elements 44, 46 and the respective layer sides of the converter device 22 in regions. As a result, the converter device can be held in the clamping frame 42 in such a manner that its upper frame element 44 is electrically connected to the first conductive layer 24, and its lower frame element 46 is electrically connected to the second conductive layer, while the frame elements 44 and 46 are insulated from one another.

The way in which the embodiments of the detectors according to the invention operate is described below. At least some of the neutrons which are to be detected are absorbed by the converter layers 24 of the converter devices 22. If the converter layer 24 substantially consists of the pure boron-10 isotope, which has proven particularly suitable, after absorption of the neutron the boron-10 nucleus spontaneously breaks down into an $\alpha$-particle and a lithium-7 nucleus. Since the momentum of the absorbed neutron is relatively low and can therefore be ignored, the $\alpha$-particle and the lithium-7 nucleus will move apart in opposite directions on account of the momentum being maintained. At least one of these conversion products will therefore move away from the layer plane of the converter device 22 or from the converter layer 24 and will ionize the counting gas. As a result, in particular free electrons are generated in the counting gas.

Ionization traces of the conversion products of this type are diagrammatically illustrated in FIG. 1. The primary electrons generated by this operation represent the signal which is actually to be detected. The charge cloud of the primary electrons is pulled toward the readout device 19 by the electrical drift field which is applied between the drift electrode 18 and the readout device 19. At least some of the electrons which are generated have to pass through one or more of the conversion devices 22 in order to reach the readout device 19. This is made possible by the charge transparency of the converter devices 22, which enables the primary electrons to reach the readout device 19 without losing their position information, so that by means of position-resolved detection of these electrons by the readout device 19, conclusions can also be drawn as to the location of ionization of the counting gas, and therefore the location of absorption of the neutron which is to be detected.

As is described in detail in U.S. Pat. No. 6,011,265 and the above-mentioned publication by F. Sauli, GEM films, given suitable electrical connections, have charge-transparent properties. As is diagrammatically illustrated in FIG. 3, the electrical field lines of the drift field contract together in the region of the passages 32 of the converter devices 22 when a potential difference which assists the drift operation is applied between the first conductive layer 28 and the second conductive layer 30. The electrical field lines widen again symmetrically behind the passages 32 in the converter devices 22, as seen in the field direction, as indicated by field lines 34. A primary electron, which has been generated by the ionizing action of a conversion product in the counting gas, follows the path of one of the field lines illustrated in FIG. 3 and therefore, through the passage 32, can be "passed" through one or more converter devices 22 while maintaining its position information.

Unlike the way in which the GEM films described in the above-mentioned documents are operated, the potential difference between the first conductive layer 28 and the second conductive layer 30, which are electrically connected to one another via a device for generating a converter field, is preferably selected to be small. For example, it is not necessary to build up field strength in the region of the passages 32 in the converter devices 22 which are so strong that they would lead to gas amplification of the primary electrons, since sufficient numbers of primary electrons for direct detection are generated by the conversion products of each individual neutron. Consequently, the converter devices 22, unlike GEM films, are not connected as gas amplifiers with amplification factors of between 10 and 100, but rather operate without amplification (amplification=1). On account of the overall energy of the conversion products which is available, amplification is therefore not required or is only required to a minor extent, with the result that a very high operating stability and service life of the detector are achieved.

The described structure of the embodiments of the detector according to the invention for neutrons advantageously allows a solid neutron converter to be used. Solid neutron converters of this type, for example converter layers of boron-10, are fundamentally much more suitable for efficient detection of neutrons, since the density of the converter atoms in a solid neutron converter is approximately 1000 times greater than in gaseous converters, with the result that a considerably higher action cross section for neutrons is available. In conventional neutron detectors, however, the use of solid converter materials leads to problems with detecting the charged conversion products. To a large extent, these products will remain concealed in the converter material itself and can only release their energy to a surrounding detection medium (e.g. a counting gas) to a limited extent. Effectively, only conversion products emanating from surface layers can be detected. The advantage of a tightly packed neutron absorber in the form of a solid body is therefore negated in conventional neutron detectors on account of the lack of likelihood of the charged fragments escaping into the surrounding detection medium.

Since the solid neutron converter and the counting gas are decoupled from one another, the counting gas can be used under standard pressure, so that there is no need for a pressure vessel. Operation at standard pressure in turn makes it possible to produce detectors which have as large a surface area as desired and can be shaped in numerous ways. A further advantage is the good time resolution of less than one microsecond which can be achieved with solid converter layers. Since the time of flight of thermal neutrons through a solid converter layer with a thickness of, for example, 1 μm is only 0.5 nanosecond, a time resolution of this order of magnitude results, which can theoretically be attained but has hitherto never been achieved.

It has proven particularly advantageous to use neutron detectors which comprise converter devices 22 arranged in cascade form. This makes it possible to provide a particularly advantageous ratio of the surface area of a converter layer to its volume. This is because the use of the solid neutron converters regularly entails problems with regard to the detection of the charged conversion products. A large proportion of these conversion products remain concealed in the solid converter itself and can only release a small proportion of their energy to a surrounding detection medium, such as for example a counting gas. Effectively, only conversion products which originate from surface layers can be detected. Therefore, under certain circumstances the advantage of a tightly packed neutron absorber in the form of a solid body can be negated by the low likelihood of the conversion products escaping into the surrounding detection medium.

However, the charge-transparent design of the converter devices 22 according to the invention preferably enables a plurality of converter devices 22 to be used in cascade form one behind the other, in order to multiply or improve the detection efficiency. The actual ionization signal, i.e. the primary electrons which are formed, can pass through the converter devices 22 while maintaining their positional information on account of the charge transparency, so that the entire electron signal can be used for detection of the absorbed neutrons. When using boron-10 as converter material in the converter layers 24 of a detector according to the invention which comprises 10 cascaded converter devices 22 coated on both sides, a detection efficiency of 75% for 2 meV neutrons, 50% for 25 meV neutrons, 35% for 100 meV neutrons and approximately 25% for 200 meV neutrons, is obtained. These high detection efficiencies of the detector system according to the invention are similar to those achieved by high-pressure helium-3 gas detectors.

The primary charge, which is generated in the cascade of charge-transparent converter devices 22, can—as described—be detected by any electrode array as an embodiment of the readout device 19. The nature and shape of the readout device 19 results in a simple manner in the spatial resolution capacity. The shape and duration of typical charge pulses results in a typical counting rate acceptance of approximately 10 million neutrons per second and pixel. The size of a pixel and therefore the spatial resolution capacity is limited by the range of the charged conversion products at standard counting rates under standard pressure to approximately 2 mm×2 mm. Therefore, the detector concept according to the invention proposed here has a rate acceptance which is approximately 1000 times greater per pixel and a linear position resolution capacity which is approximately 10 times better than previous helium-3 gas detectors for neutrons.

A further advantage of the invention is that in the detector according to the invention there is no need to use materials with a high atomic number. This results in an inherent insensitivity to gamma radiation and X-radiation. When using, for example, boron-10 as active converter material, the signals are moreover able to discriminate with respect to the residual X-ray and gamma-ray background without difficulties on account of the shape of the pulse level spectrum. In its embodiment as a neutron detector, the detector according to the invention is therefore insensitive to gamma radiation and X-radiation.

The converter devices 22 may in particular, in a simple manner, be produced from conventional GEM films, in which one or preferably both surfaces of the GEM film are provided with converter layers 24. Electron beam evaporation of the pure boron-10 isotope in powder or granule form has proven particularly suitable for the production of converter devices 22 of this type. A layer thickness of the boron-10 layer of approx. 3 μm represents an optimum for the ratio derived from the neutron absorption probability and the likelihood of the charged conversion products escaping from the solid converter into the counting gas, since the maximum range of the charged conversion products in boron-10 is only approximately 3.5 μm.

As has already been mentioned above, the use of solid converter layers 24 allows a hitherto impossible increase in the time resolution of the detector. In this connection, it is particularly advantageous to be able to unambiguously identify the specific solid converter layer 24 or the specific converter device 22 which has absorbed the neutron in question. In the case of a cascade of charge-transparent, solid converter layers 24, such as for example in the form of the GEM films which are in particular coated with boron proposed here, this can be achieved, for example, by simple additional reading of each GEM film by means of a preamplifier (cf. FIG. 5).

Each converter device 22 of the cascade which is involved in transporting the charge formed in the detector to the readout device 19 produces an electric current pulse which can be amplified by means of a preamplifier and can be detected. By specifically reading all the signals at all the converter devices 22, it is possible to unambiguously identify the specific solid converter layer 24 which has absorbed the neutron.

If all the converter devices 22 are coated with a solid converter on both sides, it is therefore possible to achieve a time resolution which corresponds to the required time of flight for the distance between two successive GEM films (for example, for a spacing of 2 mm between two films, this results in a time resolution of approximately one microsecond). Should the demands imposed on the time resolution be of outstanding importance, it is possible, if a reduced detection efficiency is accepted, to achieve a time resolution of as little as the theoretical limit of approx. 0.5 nanosecond, with GEM films which are coated on only one side.

Figure 5:
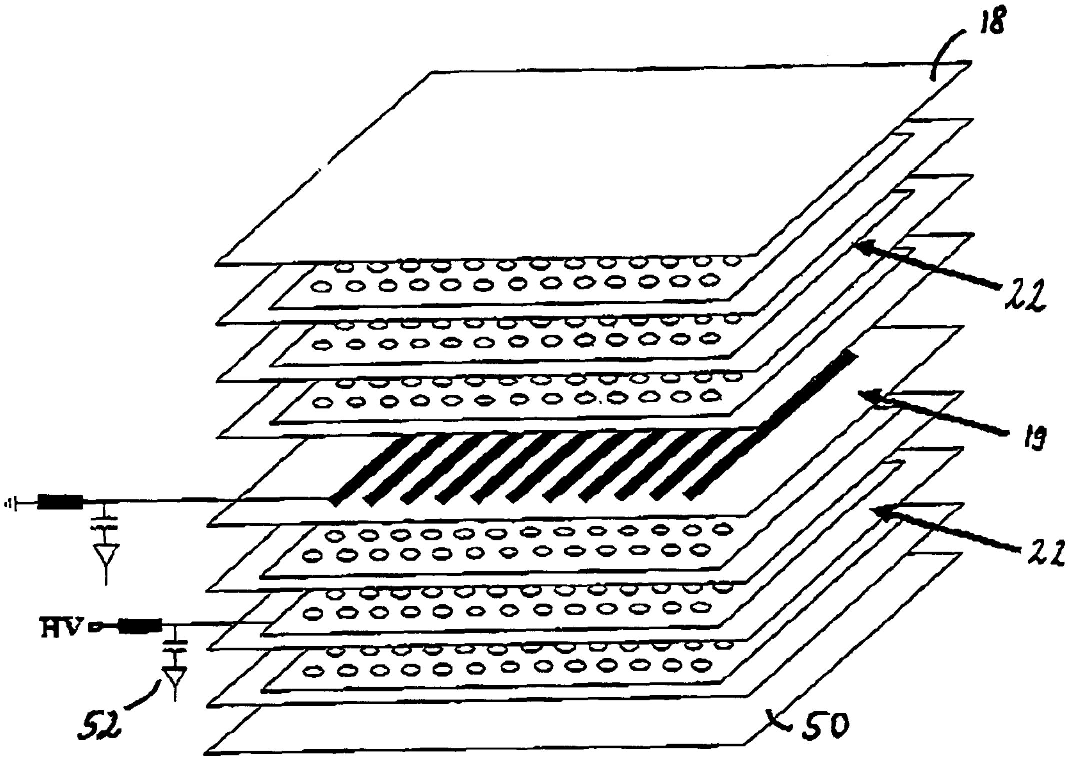
FIG. 5 shows a diagrammatic, perspective view of a detector for detecting neutrons in accordance with a further embodiment of the invention.

FIG. 5 shows a further embodiment of a detector according to the invention. Features which are identical or similar to those of the preceding embodiments are provided with identical reference symbols without the description of these features being repeated. The embodiment shown in FIG. 5 is distinguished by a symmetrical structure with regard to the readout device 19. In this way, the detection efficiency is increased while the high voltage required at the two drift electrodes 18, 50 remains constant. Furthermore, each converter device 22 (i.e. each GEM film) is read by means of a preamplifier 52 in order—as described above—to achieve a high time resolution.

To summarize, the detector presented here has an extraordinarily wide dynamic range; for example, when used as a neutron detector, from individual neutron detection to 10 MHz in each pixel. On account of the low background, the detector is therefore suitable both for the detection of individual neutrons and for use in imaging methods with high rates. A detection efficiency of approximately 50% can be achieved without major outlay. Furthermore, the detector has a time resolution of approximately one microsecond, which can be improved enormously, up to in theory approx. 0.5 nanosecond, if a reduction in the detection efficiency (to approx. 30%) is accepted. The entire construction remains mechanically simple and can be achieved using a wide range of materials.

What is claimed is:

1. A detector for detecting electrically neutral particles, comprising:

a detector housing which at least in certain regions is filled with a counting gas, a multiplicity of converter devices arranged in cascade form in the detector housing for generating conversion products as a result of the absorption of the neutral particles which are to be detected, the conversion products generating electrically charged particles in the counting gas, each of said converter devices comprising an insulator layer having opposite first and second surfaces, a first conductive layer and a second conductive layer disposed respectively on the first and second surfaces of the insulator layer such that the first and second conductive layers are electrically insulated from one another by the insulator layer, and at least one converter layer arranged on at least one of the first conductive layer and the second conductive layer to define an outermost part of each said converter device, the converter layer being formed of a material different than the conductive layer on which the converter layer is arranged, at least one readout device for detecting the electrically charged particles, at least one electrical drift field device for generating an electrical drift field for the electrically charged particles in at least a region of the volume of the counting gas in such a manner that at least some of the electrically charged particles drift toward the readout device, the converter device being of charge-transparent design and being arranged in the detector housing in such a manner that the drift field passes through at least part of each said converter device, wherein each said converter device has a multiplicity of passages, for the electrically charged particles, and the passages in at least two adjacent converter devices are not in alignment.

2. The detector as claimed in claim 1, in which the passages have a minimum diameter of between 10 μm and 1000 μm, and a minimum spacing of 10 μm to 500 μm.

3. The detector as claimed in claim 1, in which a region of each said converter device which is active in the conversion is arranged substantially perpendicularly in the drift field.

4. The detector as claimed in claim 1, in which the device for generating a drift field has a structured drift electrode to generate the drift field between the drift electrode and the readout device.

5. The detector as claimed in claim 1, in which the first conductive layer and the second conductive layer are electrically connected to a device for generating a converter field.

6. The detector as claimed in claim 5, in which the converter layer is a neutron converter layer which contains at least one of lithium-6, boron-10, gadolinium-155, gadolinium-157 and uranium-235.

7. The detector as claimed in claim 6, in which the converter layer has a layer thickness of from 0.1 μm to 10 μm, the first and second conductive layers have a layer thickness of from 0.1 μm to 20 μm, and the insulator layer has a layer thickness of from 10 μm to 500 μm.

8. The detector as claimed in claim 1, wherein the insulator layer in each of said converter devices is the only insulator layer thereof.

9. The detector as claimed in claim 1, in which each converter device includes a first converter layer and a second converter layer disposed respectively on the first conductive layer and the second conductive layer to define outermost parts of each said converter device.

10. A method for producing a converter for a detector for detecting electrically neutral particles comprising the following steps:

providing a plurality of insulator layers, each said insulator layer having opposite surfaces and two electrically conductive layers disposed respectively on the opposite surfaces of each respective insulator layer, so that the electrically conductive layers are electrically insulated from one another, each said insulator layer and the electrically conductive layers adjacent thereto defining a converter device;

providing a converter layer arranged on at least one of the conductive layers of each said converter device, the converter layer being formed of a material different than the conductive layer on which the converter layer is arranged; and arranging a plurality of the converter devices in a cascade form, wherein each said converter device has a multiplicity of passages, for the electrically charged particles, and the passages in at least two adjacent converter devices are not in alignment.

11. The method of claim 10, wherein the insulator layer in each of said converter devices is the only insulator layer thereof.

12. The detector as claimed in claim 10, in which each converter device includes a first converter layer and a second converter layer disposed respectively on the first conductive layer and the second conductive layer to define outermost parts of each said converter device.

13. A detection method for detecting electrically neutral particles comprising the following steps:

trapping the electrically neutral particles which are to be detected using a plurality of converter devices arranged in a cascade form for generating conversion products when the neutral particles are absorbed, each said converter device having an insulator with two opposite surfaces, two electrically conductive layers disposed respectively on the opposite surfaces of the insulator so that the electrically conductive layers are electrically insulated from one another, a converter layer being provided on at least one of the conductive layers of each said converter device, the converter layer being formed of a material different than the conductive layer on which the converter layer is arranged;

generating electrically charged particles in a counting gas by means of the conversion products;

diverting the electrically charged particles in an electrical drift field to a readout device, at least some of the electrically charged particles being passed through the converter devices through a multiplicity of passages, which are arranged in the form of a matrix, in the converter devices; and detecting the electrically charged particles in the readout device, wherein each said converter device has said multiplicity of passages, for the electrically charged particles, and the passages in at least two adjacent converter devices are not in alignment.

14. The method of claim 13, wherein the insulator layer in each of said converter devices is the only insulator layer thereof.

15. The detector as claimed in claim 13, in which each converter device includes a first converter layer and a second converter layer disposed respectively on the first conductive layer and the second conductive layer to define outermost parts of each said converter device.

* * * * *